United States Patent [19]

Hullstrung

[11] Patent Number: 5,072,666
[45] Date of Patent: Dec. 17, 1991

[54] DOUGH PROOFING CHAMBER

[75] Inventor: Jeffrey Hullstrung, Underhill, Vt.

[73] Assignee: G.S. Blodgett Co., Inc., Burlington, Vt.

[21] Appl. No.: 658,912

[22] Filed: Feb. 22, 1991

[51] Int. Cl.⁵ .................... A23L 1/00; A21C 13/00; H05B 1/00

[52] U.S. Cl. ........................ 99/468; 99/476; 99/483; 126/21 A; 126/281; 219/401

[58] Field of Search .......... 99/467, 468, 470, 473–476, 99/483; 126/20, 21 A, 281, 369; 219/400, 401; 312/236; 34/197

[56] References Cited

U.S. PATENT DOCUMENTS

| | | | |
|---|---|---|---|
| 3,518,949 | 7/1970 | Stock | 99/468 |
| 3,999,475 | 12/1976 | Roderick | 312/236 X |
| 4,010,349 | 3/1977 | Lee | 219/401 |
| 4,110,916 | 9/1978 | Bemrose | 34/197 |
| 4,373,430 | 2/1983 | Allen | 99/474 |
| 4,426,923 | 1/1984 | Ohata | 99/483 |
| 4,506,598 | 3/1985 | Meister | 126/21 A |
| 4,531,306 | 7/1985 | Erickson | 99/483 |
| 4,579,051 | 4/1986 | Berrens | 99/475 |
| 4,587,946 | 5/1986 | Doyon et al. | 126/20 |
| 4,674,402 | 6/1987 | Raufeisen | 99/476 |

Primary Examiner—Timothy F. Simone
Attorney, Agent, or Firm—Lowe, Price, LeBlanc & Becker

[57] ABSTRACT

A dough proofing chamber is described. The chamber is rectangular in cross section having a hollow base with an inlet into the interior of the chamber therein and a ceiling having an outlet with a duct placing the outlet in communication with the interior of the base. An evaporator and heater are disposed within the base adjacent the outlet and a circulating fan draws air from within the chamber through the outlet and duct and blows the air across the heater and evaporator and into the inlet into the interior. In order to insure uniform temperature and humidity conditions throughout the chamber, a diverter plate is disposed spaced above and covering the inlet. The diverter plate slopes from the front to the rear so that opposed nozzles are formed on either side which admit a greater flow toward the rear of the chamber of heated water vapor. A diverter plate is also disposed covering and spaced below the outlet in the ceiling. This diverter plate, however, is parallel to the ceiling.

7 Claims, 3 Drawing Sheets

DOUGH PROOFING CHAMBER

FIELD OF THE INVENTION

This invention relates to an improved chamber or cabinet for proofing dough. The cabinet of this invention is designed to maintain temperature and humidity substantially constant throughout the chamber so that the dough will rise uniformly from tray to tray.

DESCRIPTION OF THE PRIOR ART

Dough proofing chambers have been known. The chambers essentially are an insulated cabinet wherein trays of dough are stacked from top to bottom. Heated water vapor is circulated through the cabinet while the dough rises to keep the outside surface moist so that it will not become brittle and crack. In U.S. Pat. No. 3,456,598, such a cabinet is described wherein perforated racks of dough are disposed in a stacked relationship within an insulated cabinet. A humidifier is located at the base wherein water in a container with an immersion heater is evaporated with the vapor passing upwardly through a grate to circulate upwardly in the cabinet. The grate is described as two foraminous plates, the top one being slidable over the bottom so that the size of the openings from which the vapor emerges into the cabinet can be controlled. Because the humidifier or evaporator is in the base, obviously the lower racks of dough will encounter vapor at a higher temperature than the upper racks or water vapor with a greater degree of saturation. This will lead to uneven treatment of the dough from level to level.

The problem of uniformity within the cabinet was addressed in U.S. Pat. No. 4,010,349. In that cabinet, the water chamber in the base generated vapor which circulated upwardly along the rear wall and downwardly along the front wall for recirculation. The upward circulation, in part, is through a duct which has a heater therein. This was an attempt to circulate air through the cabinet and recirculate it in an attempt to reduce condensation and provide a uniform atmosphere within the cabinet.

In still another version, U.S. Pat. No. 4,373,430 provides an insulated cabinet having the humidifier in the upper portion with the vapor directed into a duct which circulates it downwardly to be released on the floor of the cabinet. In this patent, while an immersion heater is used to evaporate the water, the heater is actually cast into the bottom of the water reservoir so that periodically the reservoir may be cleaned by adding cold water to the hot, dry surface and then emptying the chamber by rotating it so that its contents are expelled into a drip pan. This is obviously a very complicated operation and a substantial apparatus probably not suitable to be employed in schools, hospitals, and small bakeries where baking on a fairly small scale is carried out.

SUMMARY OF THE INVENTION

It has been discovered, however, that a dough proofing chamber can be fabricated which will efficiently distribute heated water vapor throughout the cabinet on a recirculating basis. The device of this invention then uniformly provides the desired atmosphere within the cabinet without hot spots or cold spots.

The device of this invention is an insulated cabinet having a water pan in the base which is heated by an immersion heater. A blower is provided adjacent the water heater at the bottom of a duct in the rear. Air then from within the cabinet is withdrawn through an opening in the upper part and circulated downwardly through the duct to be blown across the heated water and returned to the cabinet through an inlet in the base. The upper outlet is covered by a diverter plate spaced away from the outlet which restricts the flow of air therethrough. The lower inlet is also covered by a diverter plate spaced away from the inlet, and which requires the heated water vapor to enter the cabinet from the sides of the diverter plate. Most importantly, it has been discovered that if the lower diverter plate is angled upwardly toward the rear of the chamber, the heated water vapor will be circulated most uniformly throughout the cabinet. In a preferred embodiment, the slope of the lower diverter plate is about 1:4.

Accordingly, it is an object of this invention to provide a dough proofing chamber which will uniformly disperse heated water vapor throughout.

It is another object to provide a dough proofing chamber wherein heated water vapor is constantly recirculated and returned to the cabinet through an inlet in the base thereof which is covered by a diverter plate.

It is still another object of this invention to provide a dough proofing chamber having a diverter plate covering the entrance for heated water vapor which angles toward the rear of the chamber and which forces a larger volume of air exiting the rear portion of the diverter plate directed toward the sides of the chamber and turbulent flow so that the heated water vapor is uniformly distributed throughout the cabinet.

These and other objects will become readily apparent with reference to the drawings and following description wherein:

DETAILED DESCRIPTION OF THE INVENTION

Figure 1:
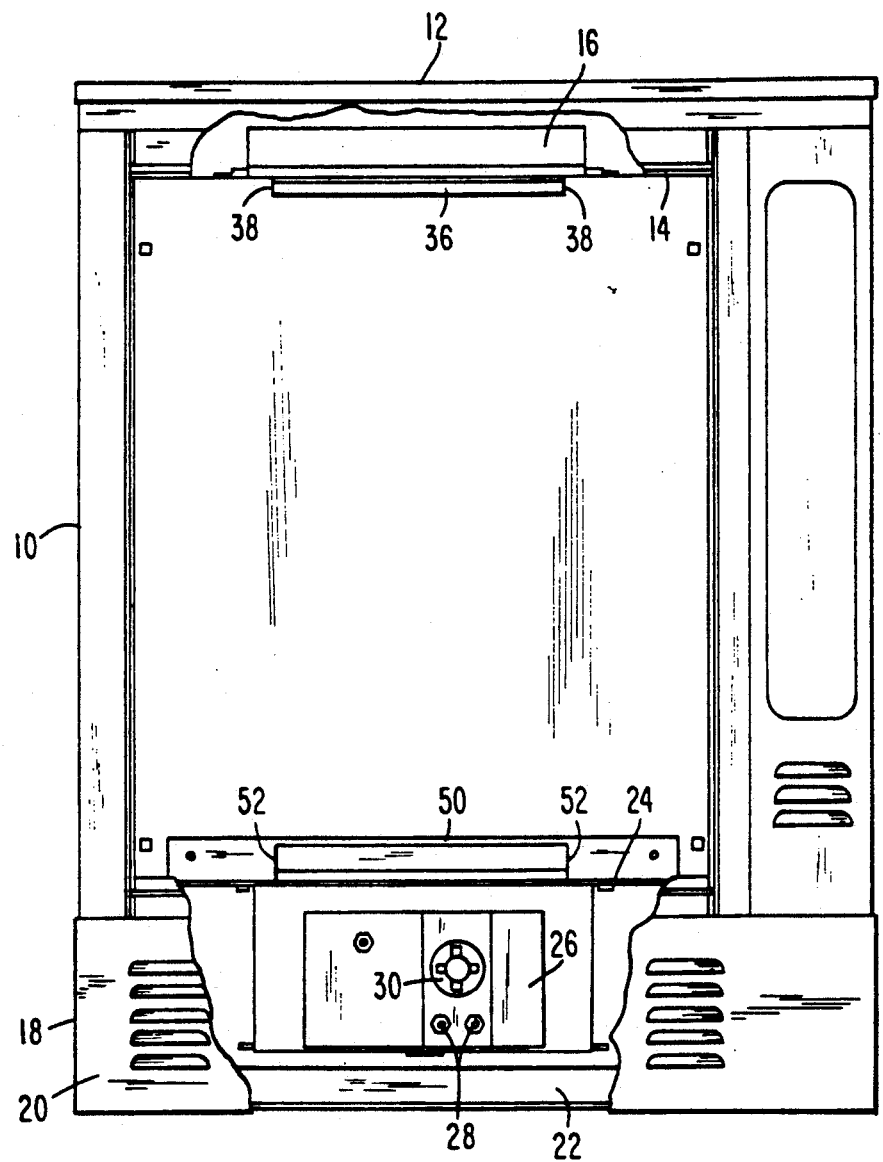
FIG. 1 is a front view of the device of this invention with the door and a portion of the front wall removed.

With attention to the drawings and to FIG. 1 in particular; the device of this invention may have conventionally insulated side walls 10 and top 12, and the top has a false ceiling 14 spaced below which houses, as will be subsequently explained, the upper portion of duct 16. The base 18 has a front wall 20 with vents therethrough, an insulated base 22 and a false bottom 24 spaced above base 22. Mounted on base 22 is a water pan 26 which has an immersion heater 28. The electrical connections therefor are not shown. Also, the pan may mount a thermostatic temperature control 30.

Figure 2:
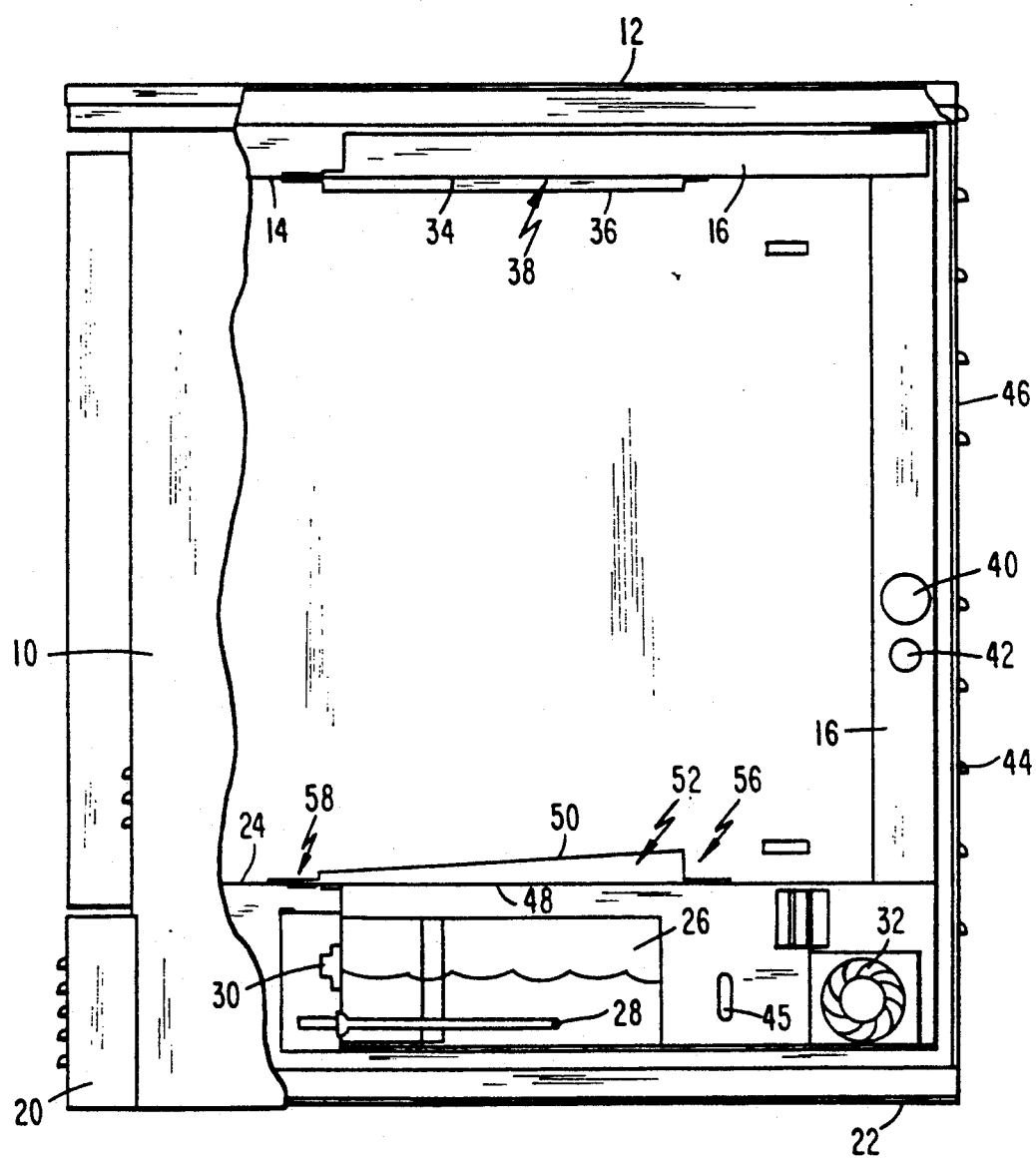
FIG. 2 is a right side view of the device of this invention with a portion of the side wall removed.
Figure 3:
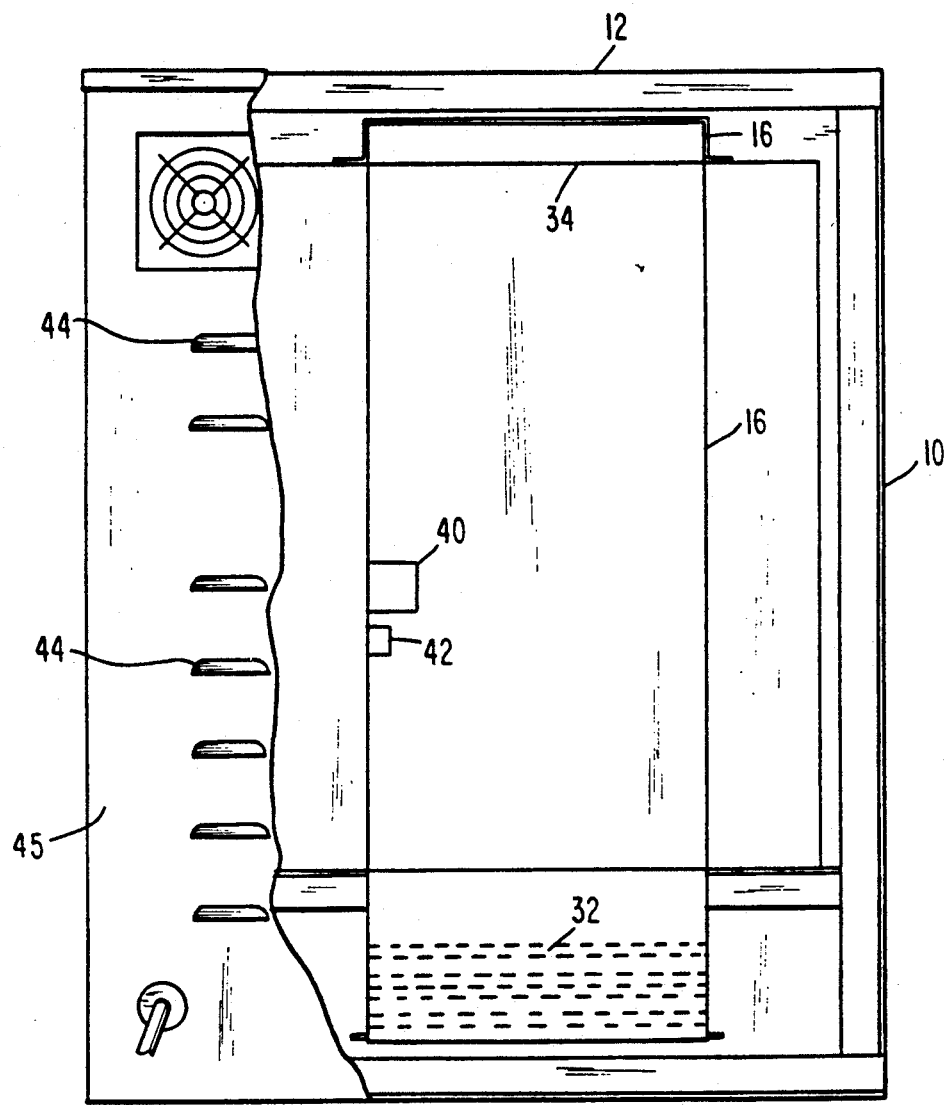
FIG. 3 is a rear view of the device of this invention with a portion of the back wall removed.

With attention to FIG. 2, air from within the chamber is drawn into duct 16 by a blower fan 32. Air enters duct 16 through the outlet 34 in ceiling 14 of the chamber. Outlet 34 is covered by a diverter plate 36 which is open at the sides 38. Inlet 34 is merely an opening. An humidity sensor 40 and a temperature sensor 42 are mounted within duct 16 to provide readings on the air returning via suction from fan 32. Vents 44 are also provided in the back wall 45, but these vents are into the interior of the chamber, not into the duct 16.

An air heater 46 is disposed between fan 32 and water bath 26. Air from within duct 16 then is blown by the fan 32 across heater 46 and across water bath 26 and through inlet opening 48 in the bottom 24 of the chamber.

Inlet 48 is covered by a lower diverter plate 50. Plate 50 is open at the sides 52. As shown in FIG. 2, lower diverter plate 50 slopes upwardly from the front towards the rear of the chamber. The side openings 52 then act as a nozzle directing the heated air from the inlet 48 laterally toward the sides 10 of the chamber and along the floor 24. As will be obvious to those skilled in the art, there will be a greater, less turbulent flow exiting from the rear 56 of diverter plate 50. As the flow exiting from the front portion 58 then will be a smaller volume, but more turbulent due to the more restricted nature of the nozzle opening. The flow then directed at the sides will be highly turbulent. It has been found that this lower diverter plate greatly improves the uniformity of the conditions within the chamber. While it is not known with certainty why, this structure facilitates uniform dispersion of the heated water vapor throughout the chamber.

In a preferred embodiment of this invention, the inside dimensions of the chamber were 21½ inches wide by 28 1/16 inches deep and 25⅞ inches high. The diverter plate 50 was disposed on a slope of about 1:4 with the upper portion 58 of the side opening being about 5/16 inches and the rear portion 56 opening about 1¼ inches. The diverter plate 50 was about 10¼ inches wide and horizontally had a length of about 13¼ inches.

The upper diverter plate need not be angled and is disposed horizontally over the inlet 38.

In operation, using controls (not shown) normally disposed on the front panel, the water pan 26 will be filled and the heater 46 set at a desired temperature. Fan 32 will then operate to start circulating air through outlet 34, duct 16, across heater 46 and water pan 26 and through inlet 48 into the chamber. Conventional detectors can be provided to automatically fill water pan 26 to signal the operator when the pan is emptying. As these features are conventional, they are not shown in the drawings.

The invention may be embodied in other specified forms without departing from the spirit or essential characteristics thereto. The present embodiments are therefore to be considered in all respects as illustrative and not restrictive, the scope of the invention being indicated by the appended claims rather than by the foregoing description, and all changes which may come within the meaning and range of equivalency of the claims are therefore intended to be embraced therein.

I claim:

1. A dough proofing chamber comprising: a cabinet having a top and a ceiling spaced below the top said ceiling defining an outlet port, a base and a floor spaced above said base said floor defining an inlet port, and upstanding sides; an evaporator and an air heater disposed on the base below the inlet port; duct means extending between the outlet port and the space between said base and floor for placing the interior of said cabinet in communication with the space between the base and floor; circulating means for withdrawing air through the outlet port and duct means, circulating it through the space between said floor and base, over said evaporator and heater and through the inlet port; an upper diverter plate covering the outlet port and spaced below said port; and a rectangular lower diverter plate covering the inlet port and spaced above said floor said lower plate having two, opposed open sides, each open side defining with the floor a nozzle having a continuous decreasing opening directed at an adjacent side of said cabinet along its length from one side of the plate to the opposite side.

2. The chamber of claim 1 wherein the floor is contained in a first plane and said lower plate is contained in a second plane, said second planes being disposed at an acute angle to said first plane.

3. The chamber of claim 2 wherein said base and top are rectangular and interconnected by four sides, one side mounting a door for access to the interior of the cabinet.

4. The chamber of claim 3 wherein said lower plate is interconnected to said floor by a first wall extending parallel to the plane containing the door and a second wall adjacent to and extending parallel to the plane containing the wall opposite to the door, the first wall being of a lesser height than the second wall so that said plate is disposed at an acute angle to said floor with opposed sides forming the nozzles.

5. The chamber of claim 4 wherein the slope of the second plane relative to the first is about 1:4.

6. The chamber of claim 4 wherein the upper plate is contained in a third plane and said ceiling is contained in a fourth plane said third and fourth planes being parallel.

7. The chamber of claim 6 wherein said upper plate is rectangular and has opposed sides contained in planes parallel to the plane containing the door, said plate being connected to said ceiling by a third wall extending the length of the side adjacent the door and a fourth wall extending the length of the opposite side, the remaining sides forming opposed inlet openings for the outlet.

* * * * *